June 20, 1939.    A. S. LIMPERT    2,163,127
SEALING MEANS FOR SHAFTS OF COMPRESSORS AND THE LIKE
Original Filed Sept. 25, 1933
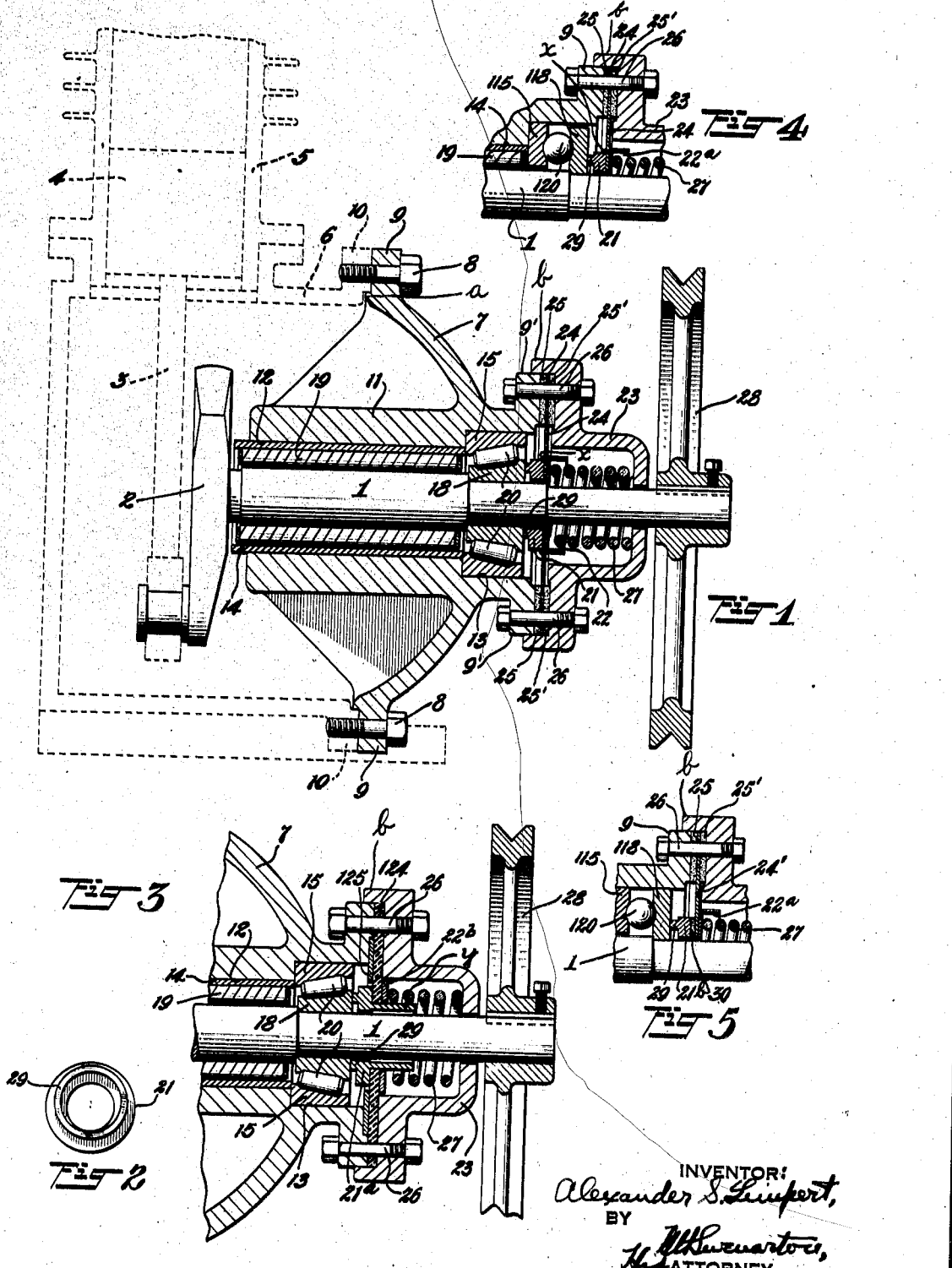

Patented June 20, 1939

2,163,127

UNITED STATES PATENT OFFICE 2,163,127

SEALING MEANS FOR SHAFTS OF COMPRESSORS AND THE LIKE

Alexander S. Limpert, Bay Shore, N. Y., assignor to Mechana Kold Corporation, Bay Shore, N. Y., a corporation of New York Application September 25, 1933, Serial No. 690,844
Renewed August 29, 1936

2 Claims. (Cl. 286—11)

This invention relates to compressors and pumps and while especially applicable to compressors of the type used in refrigerators, it is also applicable to compressors and pumps used for other purposes. It has for its particular objects the provision of a simple, inexpensive and silent seal, which is capable of effectively preventing leakage around the driving shaft of such compressor and pump, besides having other advantages hereinafter set forth.

The provision of satisfactory sealing means for the compressor of a household refrigerator has been a difficult problem, because very substantial pressures are used and the refrigerant fluid is of necessity highly volatile. The employment of ordinary packing to seal the pump against leakage of the refrigerating medium is unsatisfactory owing not only to the fact that it is not wholly effective, but also because it tends to heat up the shaft and on occasions even seize the same and stop the machine. Furthermore, such packing wears rapidly and therefore requires that it be frequently tightened and consequently must be renewed after but a short period of use. Another suggestion that has been made heretofore, contemplated the inclusion of the driving motor within the pump casing in order to dispense with the necessity of the sealing means around the pump shaft where it enters the casing. Difficulty of cooling the parts, as well as of inspection and repair has made this last expedient unattractive to many manufacturers of refrigerators so that today most of the domestic refrigerators use a motor outside the pump casing.

In my prior Patent No. 1,734,497, I have disclosed the use of a gland or sealing means of a type adapted to give longer life without the necessity of tightening or repacking an ordinary stuffing-box. One such expedient contemplated an oil absorptive or self-lubricating gland ring of bearing metal pressed tightly against some hard rotating part by a spring in order to provide the necessary seal. While this metal seal is highly effective, the heavy spring pressure necessary for effective sealing has been found sometimes to cause vibrations of a high pitched frequency which tend to produce a disagreeable noise or so-called squeal somewhat akin to that in the old stuffing-box when packed too tightly. Reduction in spring pressure might lessen the noise somewhat, but cannot be resorted to because it would lessen the effectiveness of the seal. Lubrication by oil grooves and the like is not feasible because such grooves do not afford a satisfactory seal if they extend over the entire surface of contact and if they do not lubricate the full surface, the unlubricated portions possess the liability to wear and produce annoying high pitched vibrations i. e. squeal, with consequential leakage.

According to this invention, these disadvantages have been eliminated and a quiet, well lubricated metal seal is provided without sacrificing the effectiveness of the seal. Specifically, this has been accomplished by a surface in one part of the sealing bearing which in operation engages a much wider area than the other or co-operative bearing part with the result that no one part of the bearing is without lubrication and this is attained without the employment of oil grooves or other means which might lessen the effectiveness of the seal.

In the accompanying drawing,

Figure 1 is a longitudinal, vertical section showing a portion of a compressor equipped with one embodiment of my invention, in which the gland ring is shown associated with a roller bearing and said gland ring being soldered to the transverse diaphragm;

Fig. 2 is a side elevation of the gland ring shown in Fig. 1, isolated;

Fig. 3 is a longitudinal, vertical section of another embodiment of my invention wherein a rubber or composition diaphragm, in lieu of a metal diaphragm, is employed;

Fig. 4 is a fragmentary, longitudinal, vertical section wherein the gland seal illustrated in Fig. 1 is shown associated with a ball-bearing, instead of a roller bearing; and Fig. 5 is a fragmentary, vertical, longitudinal section generally similar to Fig. 4, but wherein the gland ring is shown as constituting a separate entity from the diaphragm, there being a rubber gasket interposed therebetween.

Referring to the drawing in the embodiment illustrated, the crank shaft 1 is provided with the usual crank 2, driving a connecting rod 3 and piston 4 in the compressor cylinder 5 mounted on a crank case 6. A removable journal box 7 is secured to said crank case by means of bolts 8 which project through registering apertures annularly disposed in marginal flanges 9 and having machined contacting faces formed on said journal box and said crank case respectively. Preferably a type of joint known as a rabbeted joint is provided between the crank case and the journal box as indicated by the reference letter a in order to positively locate the journal box on the crank case and maintain the same in a central position thereon. A central internal projecting boss or bearing sleeve 11 is cast integral with the the journal box 7 and recessed at 12 and 13 to receive the raceways 14 and 15 of the roller bearings illustrated. The inner raceway 18 of a roller bearing of the well known Timken type is shrunk or pressed on the shaft to provide a gastight fit therewith. The roller 19 of another bearing of the so-called Hyatt type engages a major portion of the shaft bearing length while the rollers 20 of the Timken bearing are shorter and are angularly inclined to resist some of the spring thrust, maintain crank alignment with cylinder and tend to maintain a minimum radial clearance regardless of wear due to the flexible driving connection for the shaft.

In the forms of the invention illustrated in Figs. 1, 2 and 4, a gland ring 21 is elastically pressed against the outer side or end face of the said inner raceway 18 (see Fig. 1) or 118 (see Fig. 4) to form the desired seal. This gland ring is preferably formed either of bearing metal, such for example as alloys of lead and copper or of compositions of powdered metal, such as copper with graphite or molded mixtures of phenolic resins with graphite. A floating metal thimble 22 is engaged by the coil spring 27, which latter contacts at its other end with a hood or cap member 23 that, as shown, is provided with a marginal locating flange b which not only serves to locate the cap 23 on the shaft, but prevents the exposure of the outer end of the gasket and presents a neater and more finished appearance. A metal diaphragm 24 is clamped in position between rubber washers 25, 25' by means of bolts 26 which serve to also clamp the cap 23 to the journal box. The metal diaphragm 24 shown in Figs. 1 and 4 is soldered directly to the said gland ring as indicated by the reference letter $x$ so as to form pressure-tight joint therebetween.

In Fig. 3, in lieu of a metal diaphragm, a rubber diaphragm 124 is employed and the inner edges of the same engages with the integral sleeve 21y carried by the special form of gland ring 21a shown therein. The spring 27 in this case engages a flat metal washer 22b and the spacing washer 125 is interposed between the end of the journal box and the said rubber diaphragm in order to assist in preventing inward collapse thereof.

In the embodiment shown in Fig. 5, the metal diaphragm 24' and the gland ring 21b are spaced from each other by a rubber spacing washer 30, but otherwise the construction is essentially similar to that shown in Fig. 4.

Instead of having the adjacent side face of the gland ring directly engage the inner raceway 18, in the present invention a rim or flange 29 is provided for direct contact with the inner raceway. This flange 29 is shown eccentric, so that the entire bearing surface between the flange 29 and the inner raceway 18 may be better lubricated. Preferably the amount of eccentricity to the flange 29 exceeds the radial depth of this flange in order that in one relative angular position the flange may be out of contact with another portion of the raceway surface with which it later contacts. The gland ring, of whichever type employed, whether 21; 21a or 21b, is maintained tightly pressed against the inner raceway by the spring 27 to provide an effective seal between the flange 29 and the inner raceway. The gland ring 21 is thus made essentially floating even when soldered to the diaphragm 24, since the gland ring, which envelopes the shaft and remains stationary or practically stationary when the latter is in rotation, even though the gland ring is not soldered to the diaphragm, owing to the fact that the reduced bearing surface between the flange 29 and the inner raceway, is then sufficient to cause a tendency of the gland ring to rotate which might otherwise occur were this contacting or sealing surface of the gland ring much larger.

This flange 29 has been shown eccentric, but it will be understood that other forms might be employed that are generally concentric with the gland ring, but slightly polygonal or star-shaped convolute so that some portion of the flange may be somewhat nearer the shaft than other portions, preferably by an amount equal to or slightly less than the radial depth of such flange, in order to secure the desired improved lubrication. The eccentric construction illustrated in Fig. 2 is, however, preferred because of the simplicity of its construction and also because at higher speeds it affords a greater opportunity for lubrication to flow over the outer end of the inner raceway than if the flange were, as above stated, generally concentric. The gland ring will be found to possess good wearing qualities although, of course, it will be subject to greater wear than the inner raceway and after prolonged use if replacement is desired, this can be readily accomplished by removal of the bolts 26 and the cap 23 which permits of a new gland ring being inserted. While the contacting surfaces of the gland ring and flange 29 are comparatively small, it will nevertheless be appreciated that the cooperative surface on the outer end of the inner raceway 18 is larger and therefore this is an additional reason why such wear as occurs will be largely confined to the gland ring 21. The lubricant from the rollers 20 travels down the side of the raceway far enough to be engaged by the flange 29 with the result that the flange and seal become sufficiently lubricated without sacrificing the effective sealing character of the flange, all of which results in noiseless operation without objectionable squeal or chatter.

In Fig. 3 a metal plate or spacing washer 125, as previously stated, serves to limit the flexure and thereby safeguards the rubber gasket 124. The Timken roller bearing having its roller angularly disposed as illustrated, is effective in transmitting a substantial portion of the end thrust on the inner raceway due to the spring 27.

The gland ring 21a having an integral cylindrical sleeve 21y as illustrated in Fig. 3, not only prevents the rubber gasket or diaphragm 124 from contacting directly with the shaft and generating noise during the rotation of the latter, but also insures against the breaking down under friction of such rubber gasket with the consequent gumming up of the shaft and the gland ring as might otherwise occur were the inner edge of the rubber or non-metallic gasket 124 to frictionally engage the shaft. Furthermore, as shown, there should be sufficient clearance between the inner circular edge of the diaphragm 124 and the outer surface of the sleeve when said diaphragm and said sleeve are first assembled and prior to the application of the cap 23 and the compression of the spring 27, so that when the diaphragm is compressed by the action of the spring against the washer 22b, it will not be unduly buckled or distorted, but will remain substantially flat. Also, as shown, the said sleeve $y$ is reamed out so as to be of slightly larger diameter than the diameter of the gland ring 21a, as thereby whatever contact occurs between the shaft and the ring will only be long in area and equal in length to the longitudinal length of the ring 21a proper, thus reducing any friction between the ring and the shaft to a minimum.

While I prefer to provide the eccentric rim on the gland ring, a similar effect to that obtained by me can also be obtained by forming such eccentric rim on the vertical contacting face of the shoulder 29, though such an arrangement would probably be more expensive, obviously therefore, such a construction is within the scope and spirit of my invention as herein claimed. Furthermore, in lieu of providing a gland ring with an eccentric rim, the central hole in the gland ring through which the shaft projects, may be made eccentric and the same may be surrounded by the concentric rim, whereby essentially similar results will be obtained and such a change is also within the scope and spirit of my invention as herein claimed.

In the embodiment of my invention herein illustrated, not only is the gland ring accessible and readily removed, but also the entire shaft bearing may be removed by disconnecting the bolts 7 if the cylinder is removed from the piston. Also this design makes possible a complete unit assembly of shaft bearings and seal.

The term "shoulder element" in the claims is used in a generic sense to include either a shoulder integrally formed on the shaft or a shoulder of an applied element such as is constituted by the outer face of an inner raceway of a bearing that is shrunk on to said shaft.

Various other changes than those herein mentioned, which are within the scope of the appended claims, may be made without departing from the spirit of my invention.

Having thus described my invention, what I claim and desire to obtain by United States Letters Patent is:

1. Sealing means for compressor shafts of refrigerating machinery, comprising a main shaft having a shoulder element provided with a smooth radially extending annular face, a housing through which said shaft projects and sealing means having a gas-tight fit with a lateral face of the shoulder element for preventing the escape of fluid through the joint between the shaft and the housing, said sealing means including a spring-pressed metallic diaphragm, a floating metallic washer surrounding said shaft and interposed between said diaphragm and such lateral face of said shoulder element and a resilient spacing washer interposed between said floating metallic washer and said diaphragm.

2. Sealing means for compressor shafts of refrigerating machinery, comprising a main shaft having a shoulder element thereon, said element having a smooth, annular, radial face, a housing through which said shaft projects and sealing means having a gas-tight fit with the same smooth face for preventing the escape of fluid through the joint between the shaft and the housing, said sealing means including a spring-pressed metallic diaphragm, a floating metallic washer surrounding said shaft and interposed between said diaphragm and such smooth face, a resilient spacing washer interposed between said floating metallic washer and said diaphragm, said floating metallic washer being provided on its face adjacent said shoulder element with an elevated contacting and sealing surface which is eccentric to the center of said washer, whereby a film of lubricant can be permanently maintained between the radial face of said shoulder element and the adjacent lateral face of said washer.

ALEXANDER S. LIMPERT.